United States Patent [19]
Handa et al.

[11] Patent Number: 5,616,916
[45] Date of Patent: Apr. 1, 1997

[54] CONFIGURATION MEASURING METHOD AND APPARATUS FOR OPTICALLY DETECTING A DISPLACEMENT OF A PROBE DUE TO AN ATOMIC FORCE

[75] Inventors: Koji Handa, Osaka; Keishi Kubo, Moriguchi; Masateru Doi, Hirakata; Keiichi Yoshizumi, Osaka, all of Japan

[73] Assignee: Matsushita Electric Industrial Co., Ltd., Osaka-fu, Japan

[21] Appl. No.: 563,071

[22] Filed: Nov. 27, 1995

[30] Foreign Application Priority Data

Nov. 28, 1994 [JP] Japan .................................. 6-292460

[51] Int. Cl.$^6$ ........................................................ H01J 3/14
[52] U.S. Cl. ............................................ 250/234; 250/306
[58] Field of Search ..................................... 250/234, 306, 250/307, 559.22; 356/376

[56] References Cited

U.S. PATENT DOCUMENTS

| Re. 33,387 | 10/1990 | Binnig | 250/306 |
| 5,135,715 | 10/1992 | Ueyema et al. | 250/307 |
| 5,294,804 | 3/1994 | Kajimura | 250/306 |
| 5,394,741 | 3/1995 | Kajimura et al. | 250/306 |
| 5,408,094 | 4/1995 | Kajimura | 250/234 |

Primary Examiner—Edward P. Westin
Assistant Examiner—Kevin Pyo
Attorney, Agent, or Firm—Wenderoth, Lind & Ponack

[57] ABSTRACT

Substantially collimated displacement detection light is led to a first lens and condensed by the first lens to proximities to a reflecting surface of a probe. The reflected light is displaced by an atomic force acting against a surface of a sample, where the reflected light varies in reflection angle according to the displacement. The displaced light is lead to the first lens, changed in direction by a mirror, and detected by magnifying the displacement of the probe. The detection further includes steps of moving a Z direction scan block in a direction vertical to the sample surface by a Z direction driving device, the Z direction scan block having the first lens and the probe, moving an X direction scan block in a first axial direction within a plane parallel to the sample surface by an X direction driving device, the X direction scan block having the Z direction scan block, the Z direction driving device, and the mirror, and moving a Y direction scan block by a Y direction driving device in a second axial direction perpendicular to the first axial direction within a plane parallel to the sample surface, the Y direction scan block having the X direction scan block, the X direction driving device, the detection light radiation system, and the displacement detection system.

20 Claims, 8 Drawing Sheets

CONFIGURATION MEASURING METHOD AND APPARATUS FOR OPTICALLY DETECTING A DISPLACEMENT OF A PROBE DUE TO AN ATOMIC FORCE

BACKGROUND OF THE INVENTION

The present invention relates to configuration measuring method and apparatus for measuring a configuration of a surface of a sample, specifically, for optically detecting a displacement of a probe due to an atomic force that acts between the end of the probe having a needle fitted to the free end of a cantilever, and the sample surface. More particularly, the invention relates to configuration measuring method and apparatus which are suitable for treating large-size, large-area samples. One example of the configuration measuring apparatus can be constructed by an atomic force microscope.

The atomic force microscope for measuring pits and projections of a sample surface with a precision of nanometers or less has been applied to an increasingly expanding range of fields with the recent years trend toward the higher density and the higher degree of integration in optical disks, magnetic recording, semiconductors, and the like. The atomic force microscope is available in various types such as the optical lever type, the optical interference type, and the critical angle type. Below described with reference to FIG. 5 is an optical lever type atomic force microscope which can be implemented with a very simple construction.

Referring to FIG. 5, a sample 41 is fixedly set on a scanner 44 which is movable in X, Y, and Z directions. A probe 42 supported at one end by a probe holder 43 is positioned on the sample 41.

A light source 45 applies a light beam 46 through a lens 47 to a reflecting surface of the probe 42 on the side opposite to the sample 41. A photodetector 48 is supported in such a position as to capture the light beam 46 reflected by the reflecting surface of the probe 42. The lens 47 is located on the axis that connects the light source 45 and the probe 42 to each other, and condenses the light beam 46, which has been applied by the light source 45, onto the photodetector 48 or to one point in its proximity.

When the probe 42 is put into close proximity to the surface of the sample 41, a deflection is caused on the probe 42 due to an atomic force that acts on the probe 42 and the surface of the sample 41. As a result, the reflection angle of the light beam 46 reflected by the reflecting surface of the probe 42 changes to a slight amount. A displacement $\Delta Z$ in the Z direction of the probe 42 is magnified and detected on the photodetector 48 that has captured the light beam reflected by the reflecting surface of the probe 42. While this displacement in the Z direction is being detected, the scanner 44 having the sample 41 set thereon is raster-scanned in the X and Y directions and further vibrated in the Z direction, as shown in FIG. 6, whereby the surface configuration of the sample 41 is measured.

However, in the prior art example as shown in FIG. 5, the scanner 44, on which the sample 41 is fixed, is moved in the X, Y, and Z directions for the raster scanning of the sample 41. Therefore, when the surface of a large-area, large-size sample is observed, there would arise a large inertia force due to the sample's own weight. This makes it difficult to control the scanner 44 on which the sample 41 is fixed.

Further, indeed the atomic force microscope is suited to measure microscopic regions of several tens μm or less square with a precision of nanometers or less, but the atomic force microscope's own magnification is too high to observe larger ranges. For example, in measuring pits such as defects of the sample surface that can be observed by an optical microscope, it would matter to correct the shift between a place that is the actual observation target, and a place that is being actually observed.

Recently, atomic force microscopes are used for evaluation of the configurations of pits of an optical disk with a 30 cm diameter, as well as for evaluation of the gap length of the magnetic head of a cylinder-equipped video head, and for evaluation of electronic components. For these measurements, there is a growing field demand for measuring samples in non-destructive fashion for the purpose of sampling inspections in the production line. However, for the conventional atomic force microscopes, it has been difficult to achieve the measurement without cutting the sample itself into about 1 cm square pieces.

SUMMARY OF THE INVENTION

An object of the present invention is therefore to provide configuration measuring method and device by using which are able to measure large-area, large-size samples without the need of cutting such samples but with the size unchanged.

In accomplishing these and other aspects, according to one aspect of the present invention, there is provided a configuration measuring method comprising steps of:

radiating substantially collimated displacement detection light from a detection light radiation system;

changing the substantially collimated displacement detection light in direction by a mirror into a substantially perpendicular direction so as to be led to a first lens;

condensing the displacement detection light by the first lens to proximities to a reflecting surface of a probe;

reflecting the condensed light by the reflecting surface of the probe;

displacing the reflected light by an atomic force acting against a surface of a sample, where the reflected light varies in reflection angle according to the displacement;

leading the displaced light to the first lens;

leading the led light to a displacement detection system by being changed in direction by the mirror into a substantially perpendicular direction; and detecting the light led to the displacement detection system by magnifying the displacement of the probe, the method further comprising steps of:

moving a Z direction scan block in a direction vertical to the sample surface by a Z direction driving device, the Z direction scan block having the first lens and the probe;

moving an X direction scan block in a first axial direction within a plane parallel to the sample surface by an X direction driving device, the X direction scan block having the Z direction scan block, the Z direction driving device, and the mirror; and moving a Y direction scan block by a Y direction driving device in a second axial direction perpendicular to the first axial direction within a plane parallel to the sample surface, the Y direction scan block being connected to the X direction scan block, the X direction driving device, the detection light radiation system, and the displacement detection system.

According to another aspect of the present invention, there is provided a configuration measuring method comprising steps of:

radiating substantially collimated displacement detection light from a detection light radiation system;

changing the substantially collimated displacement detection light in direction by a mirror into a substantially perpendicular direction so as to be led to a first lens;

condensing the displacement detection light by the first lens to proximities to a reflecting surface of a probe;

reflecting the condensed light by the reflecting surface of the probe;

displacing the reflected light by an atomic force acting against a surface of a sample, where the reflected light varies in reflection angle according to the displacement;

leading the displaced light to the first lens;

leading the led light to a displacement detection system by being changed in direction by the mirror into a substantially perpendicular direction; and detecting the light led to the displacement detection system by magnifying the displacement of the probe, the method further comprising steps of:

moving a Z direction scan block in a direction vertical to the sample surface by a Z direction driving device, the Z direction scan block having the first lens and the probe;

moving an X-Y direction scan block within a plane parallel to the sample surface by an X-Y direction driving device, the X-Y direction scan block having the Z direction scan block, the Z direction driving device, the mirror, the detection light radiation system, and the displacement detection system.

According to further aspect of the present invention, there is provided a configuration measuring apparatus in which substantially collimated displacement detection light radiated from a detection light radiation system is changed in direction by a mirror into a substantially perpendicular direction so as to be led to a first lens; displacement detection light is condensed by the first lens to proximities to a reflecting surface of a probe; and in which reflected light reflected by the reflecting surface of the probe that will be displaced by an atomic force acting against a surface of a sample, where the reflected light varies in reflection angle according to the displacement, is led to the first lens and then, by being changed in direction by the mirror into a substantially perpendicular direction, led to a displacement detection system, where the displacement of the probe is magnified and detected, the apparatus comprising:

a Z direction scan block having the first lens and the probe;

a Z direction driving device for moving the Z direction scan block in a direction vertical to the sample surface;

an X direction scan block connected to the Z direction scan block, the Z direction driving device, and the mirror;

an X direction driving device for moving the X direction scan block in a first axial direction within a plane parallel to the sample surface;

a Y direction scan block connected to the X direction scan block, the X direction driving device, the detection light radiation system, and the displacement detection system; and a Y direction driving device for moving the Y direction scan block in a second axial direction perpendicular to the first axial direction within the plane parallel to the sample surface.

According to a still further aspect of the present invention, there is provided a configuration measuring apparatus in which substantially collimated displacement detection light radiated from a detection light radiation system is changed in direction by a mirror into a substantially perpendicular direction so as to be led to a first lens; displacement detection light is condensed by the first lens to proximities to a reflecting surface of a probe; and in which reflected light reflected by the reflecting surface of the probe that will be displaced by an atomic force acting against a surface of a sample, where the reflected light varies in reflection angle according to the displacement, is led to the first lens and then, by being changed in direction by the mirror into a substantially perpendicular direction, led to a displacement detection system, where the displacement of the probe is magnified and detected, the apparatus comprising:

a Z direction scan block having the first lens and the probe;

a Z direction driving device for moving the Z direction scan block in a direction vertical to the sample surface;

an X-Y direction scan block connected to the Z direction scan block, the Z direction driving device, the mirror, the detection light radiation system, and the displacement detection system; and an X-Y direction driving device for moving the X direction scan block within a plane parallel to the sample surface.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
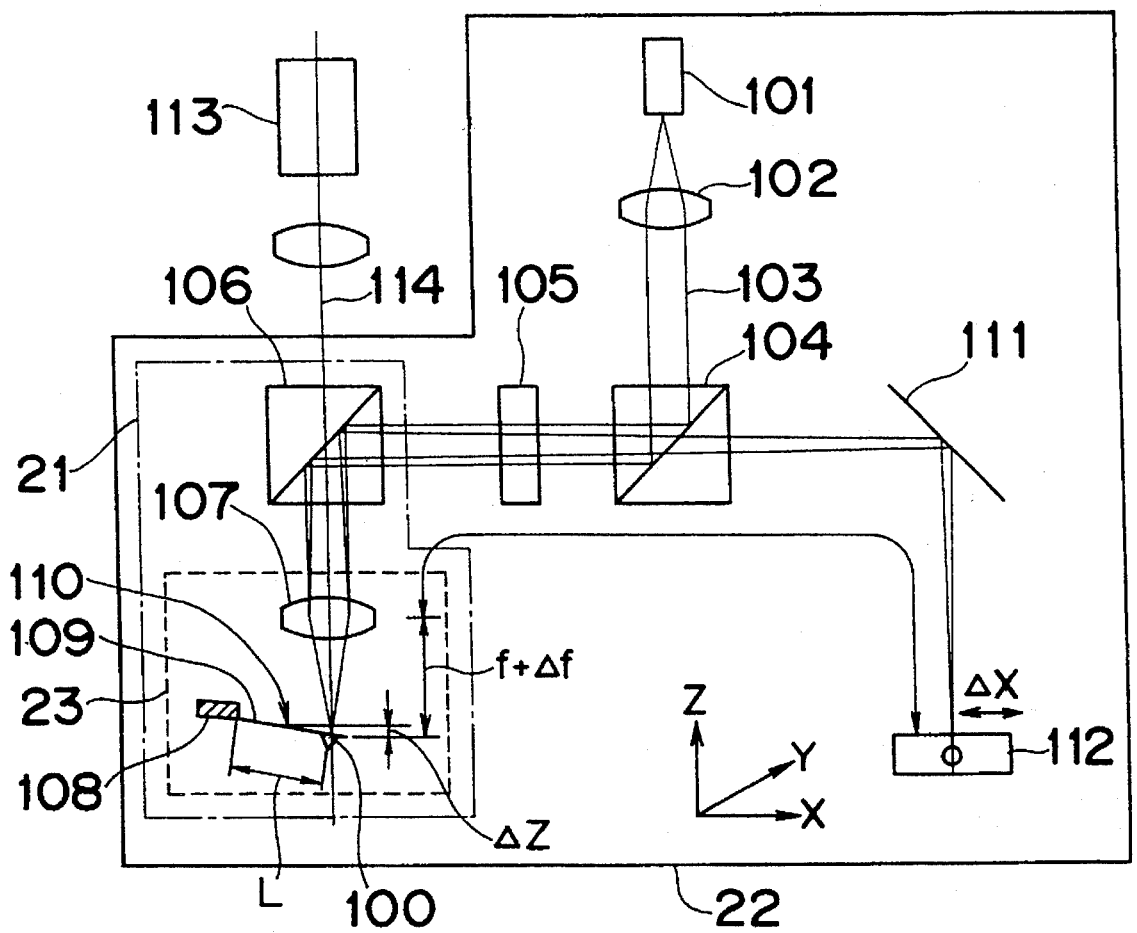
FIG. 1 is a principle view showing the construction of an atomic force microscope according to an Embodiment 1 of the present invention.

Before the description of the present invention proceeds, it is to be noted that like parts are designated by like reference numerals throughout the accompanying drawings.

Embodiment 1

An Embodiment 1 of the present invention is now described with reference to the accompanying drawings. FIG. 1 shows the basic construction of the atomic force microscope of the present embodiment.

Figure 2:
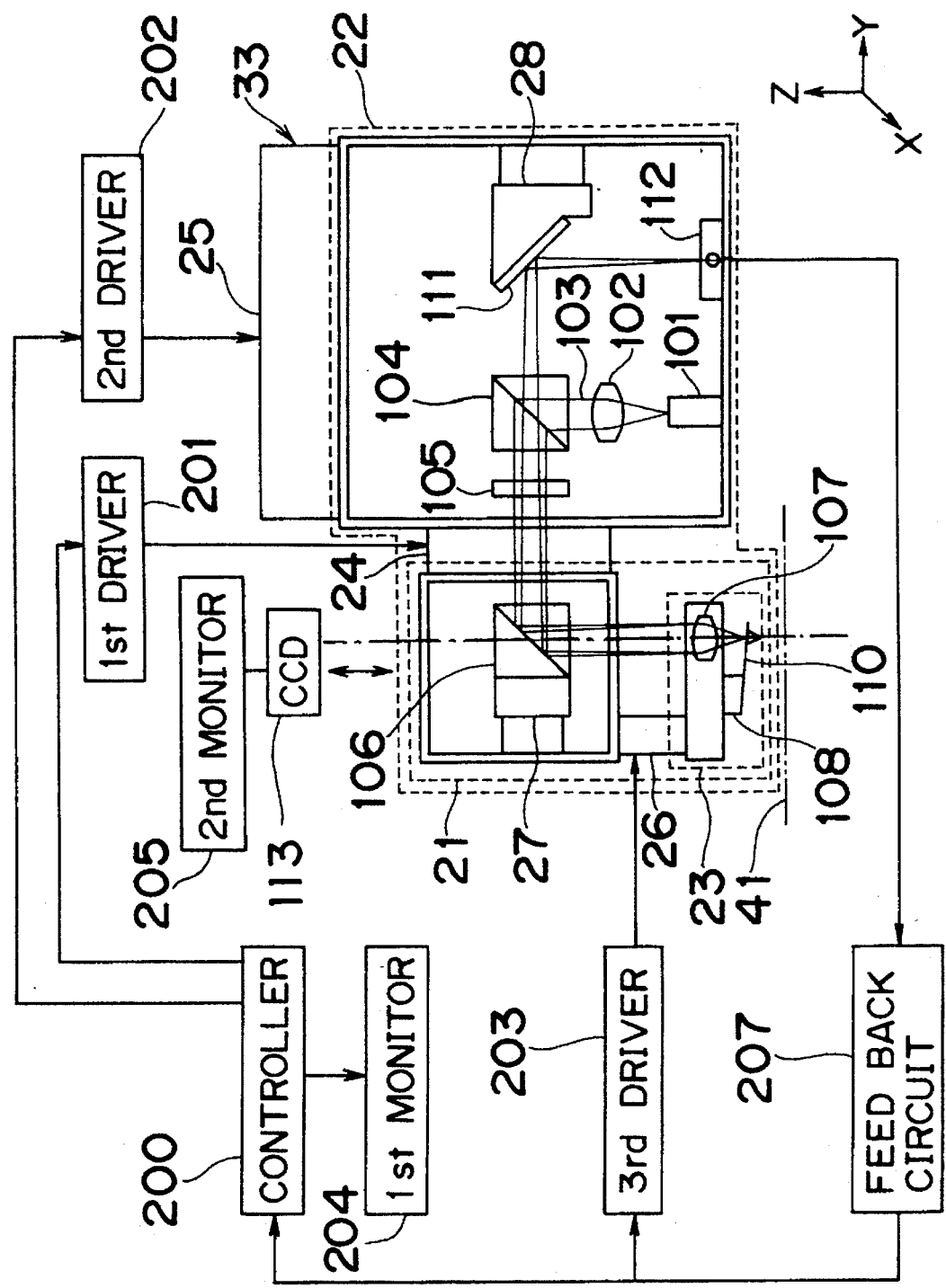
FIG. 2 is a principle view showing the construction of the measuring head of the atomic force microscope.

A probe 110 comprises a cantilever 109 and a needle 100 fitted to its free end lower surface, and has a reflecting surface at the free end upper surface of the cantilever 109. The probe 110 is supported by a holder 108 at the base end of the cantilever 109. A semiconductor laser beam source 101 emits a laser beam (displacement detection light) 103 toward a collimator lens 102 placed below or above (FIGS. 1 and 2 show cases where the semiconductor laser beam source 101 is placed above and below, respectively). The collimator lens 102 collimates the laser beam 103. A polarization beam splitter 104 perpendicularly reflects the laser beam 103 emitted from the laser beam source 101, leading the reflected laser beam 103 to the quarter wavelength plate 105 and the dichroic mirror 106. The dichroic mirror 106 perpendicularly reflects the laser beam 103, passing it through a confocal lens 107 placed below, and thus leading it to the reflecting surface of the free end of the cantilever 109. The laser beam 103 reflected by the reflecting surface returns to the polarization beam splitter 104 via the confocal lens 107, the dichroic mirror 106, and the quarter wavelength plate 105, whereas the polarization beam splitter 104 transmits the reflected laser beam 103, leading it to the mirror 111. The transmitted laser beam 103 is perpendicularly reflected by the mirror 111 and thus led to the two-piece photodiode 112 placed below.

The dichroic mirror 106 reflects only the laser beam 103 having particular wavelengths, leading the laser beam 103 to the reflecting surface of the free end of the cantilever 109 via the confocal lens 107, while the dichroic mirror 106 transmits the light of wavelengths other than those of the laser beam 103 having the particular wavelengths. The confocal lens 107, which is a lens having a focal length f in each of two directions on the optical path, condenses the laser beam 103 led from the dichroic mirror 106 to proximities of the free end reflecting surface of the cantilever 109 supported by the probe holder 108, and further condenses the reflected laser beam 103 derived from the free end reflecting surface onto the two-piece photodiode 112 via the dichroic mirror 106, the quarter wavelength plate 105, the polarization beam splitter 104, and the mirror 111. By furthering the distance between the free end reflecting surface of the cantilever 109 and the lower end of the confocal lens 107 by a length of $\Delta f$ in addition to the focal length f of the confocal lens 107, the laser beam 103 incident from the dichroic mirror 106 via the confocal lens 107 is defocused by $\Delta f$ from the reflecting surface of the free end of the cantilever 109, whereby the laser beam 103 derived from the free end reflecting surface of the cantilever 109 can be condensed onto the two-piece photodiode 112.

A CCD camera 113 placed above the dichroic mirror 106 captures illuminating light 114 for use of sample observation, which is reflected by the free end reflecting surface of the cantilever 109, the sample surface, and the like, via the dichroic mirror 106 and the confocal lens 107. Thus, the CCD camera 113 obtains image information on the needle 100 of the probe 110 and its neighborhood.

As described above, the semiconductor laser beam source 101, the collimator lens 102, the polarization beam splitter 104, and the quarter wavelength plate 105 constitute a detection light radiation system. The quarter wavelength plate 105, the polarization beam splitter 104, the mirror 111, and the two-piece photodiode 112 constitute a displacement detection system. The CCD camera 113 and a second monitor 205 described later constitute an example of an image display device.

Next, the principle of displacement detection is described with reference to FIG. 1. As shown in FIG. 1, if the focal length of the confocal lens 107 is f, the distance from the stationary end of the cantilever 109 to the needle 100 is L, the Z-direction displacement of the cantilever 109 due to an atomic force generated between the sample surface and the needle 100 is $\Delta Z$, and if the X-direction displacement of the laser beam 103 on the two-piece photodiode 112 is $\Delta X$, then an expression holds, $\Delta X=(3f/L)/\Delta Z$. In this expression, if $f=8$ mm and $L=0.1$ mm, then $\Delta X=240 \cdot \Delta Z$, where the displacement $\Delta Z$ of the cantilever 109 in the Z direction is magnified 240 times and detected as such on the two-piece photodiode 112. In this case, if the detection sensitivity of the two-piece photodiode 112 is 0.025 μm, then the resolution in the Z direction is approximately 0.1 nm.

With the constitution as described above, because the laser beam 103 that is the displacement detection light is converged on the two-piece photodiode 112, the spot diameter of the laser beam 103 on the two-piece photodiode 112 results in a small one. Therefore, the detection sensitivity of the two-piece photodiode 112 with respect to the displacement $\Delta Z$ of the cantilever 109 can be improved. Thus, even when the measuring head is made to scan the sample surface, a resolution on the order of Angstrom or lower can be attained.

Figure 6:
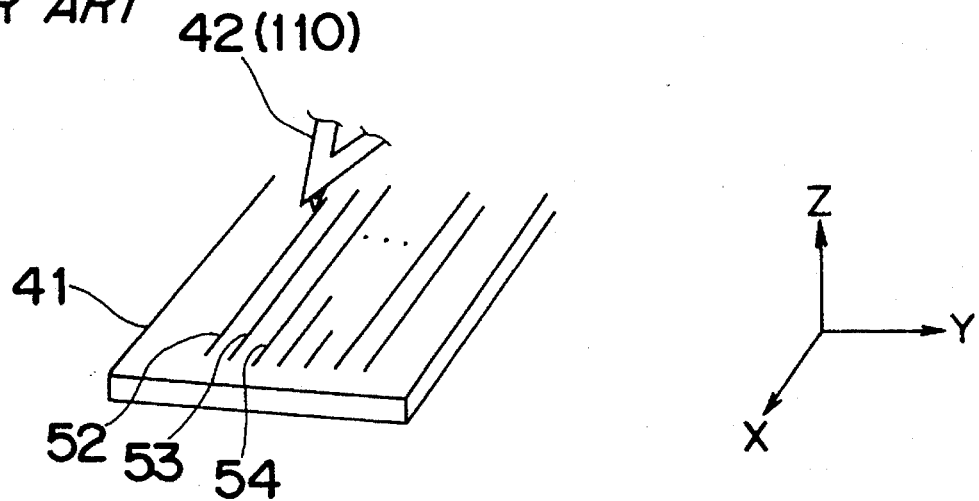
FIG. 6 is a perspective view showing the method of scanning the sample surface in the atomic force microscope.

Next, the scanning system of the present embodiment is described with reference to FIG. 2. Generally, in the scanning process of an atomic force microscope, as shown in FIG. 6, the probe 110 scans one line in the X direction, tracking the surface of the sample 41, and then lines 52, 53, 54, ... to capture the image information while being moved in the Y direction perpendicular to the X direction, thus obtaining configuration information on the surface of the sample 41. In the case of the scanning illustrated in FIG. 6, response frequencies of several kHz are required in the Z direction for the tracking of the sample surface. Also, for the raster scan as described above, response frequencies of several Hz are required for the X direction and those of several hundredths are required for the Y direction.

Referring to FIG. 2, which shows a measuring head 33, the Z direction scanner denoted by reference numeral 26 is designed to move a Z direction scan block 23 composed of the confocal lens 107, the probe holder 108, and the probe 110, in the Z direction perpendicular to the surface of the sample 41. The Z direction scan block 23 can be made very lightweight by virtue of its components such as the confocal lens 107 and the probe 110, so that the Z direction scan block 23 is enabled to respond in the Z direction at high speed. The X direction scanner denoted by 24 in FIG. 2 is designed to move in the X direction an X direction scan block 21 further composed of the dichroic mirror 106 and a gate adjustment mechanism 27 in addition to the Z direction scan block 23 and the Z direction scanner 26. The X direction scan block 21 to be moved by the X direction scanner 24 has a required response frequency as small as several Hz in the X direction, so that even if quite heavier in weight than the Z direction scan block 23, the X direction scan block 21 can be enough controlled in the X direction. Further, due to the fact that the laser beam 103 that has been incident on the confocal lens 107 is collimated light, even if the Z direction scan block 23 is moved in the Z direction within the X direction scan block 21, both of them will be always located at the same X-direction position. As a result, there will occur no errors in measurement of the displacement ΔZ of the probe 110. The Y direction scanner denoted by 25 in FIG. 2 is designed to move in the Y direction a Y direction scan block 22 further composed of the semiconductor laser beam source 101, the collimator lens 102, the polarization beam splitter 104, the quarter wavelength plate 105, the mirror 111, a gate adjustment mechanism 28, and the two-piece photodiode 112, in addition to the X direction scan block 21 and the X direction scanner 24. The Y direction scan block 22 to be moved by the Y direction scanner 25 has a required response frequency as very small as several hundredths Hz in the Y direction, so that even if quite a large size block (several hundreds gram), the Y direction scan block 22 can be enough controlled in the Y direction.

In FIG. 2, reference numeral 200 denotes a controller, 201 a first driver for driving the X direction scanner 24 based on signals from the controller 200 for the scanning, 202 a second driver for driving the Y direction scanner 25 based on signals from the controller 200 for the scanning, 203 a third driver for driving the Z direction scanner 26 based on signals from the controller 200, 204 a first monitor for displaying the sample surface, 205 a second monitor for displaying the image taken by the CCD camera 113, and 207 a feedback circuit for feeding-back signals obtained by the two-piece photodiode 112 to the third driver 203 so as to control the operation of the Z direction scanner 26 under a feedback control and for transmitting the signals obtained by the two-piece photodiode 112 to the controller 200 so as to display the image of the sample surface on the first monitor 204. The first, second, and third drivers 201, 202, 203 can independently drive the X direction scanner 24, Y direction scanner 25, and Z direction scanner 26 by the controller 200.

In addition, the provision of the gate adjustment mechanism 27 to the dichroic mirror 106 makes it possible to adjust the position on which the laser beam 103 is converged by the free end reflecting surface of the cantilever 109. Likewise, the provision of the gate adjustment mechanism 28 to the mirror 111 makes it possible to adjust the position on which the laser beam 103 is converged by the two-piece photodiode 112.

The Z direction scanner 26 can be implemented by a piezoelectric device or the like. The X direction scanner 24 and the Y direction scanner 25 can also be implemented by a piezoelectric device or the like, likewise. However, as measures for a zigzagging phenomenon due to the measuring head's own dead weight during raster scanning processes, the X direction scanner 24 and the Y direction scanner 25 are desirably made up by incorporating parallel-plate springs and piezoelectric devices in combination, so that a stable scanning of the sample surface can be achieved.

Figure 7:
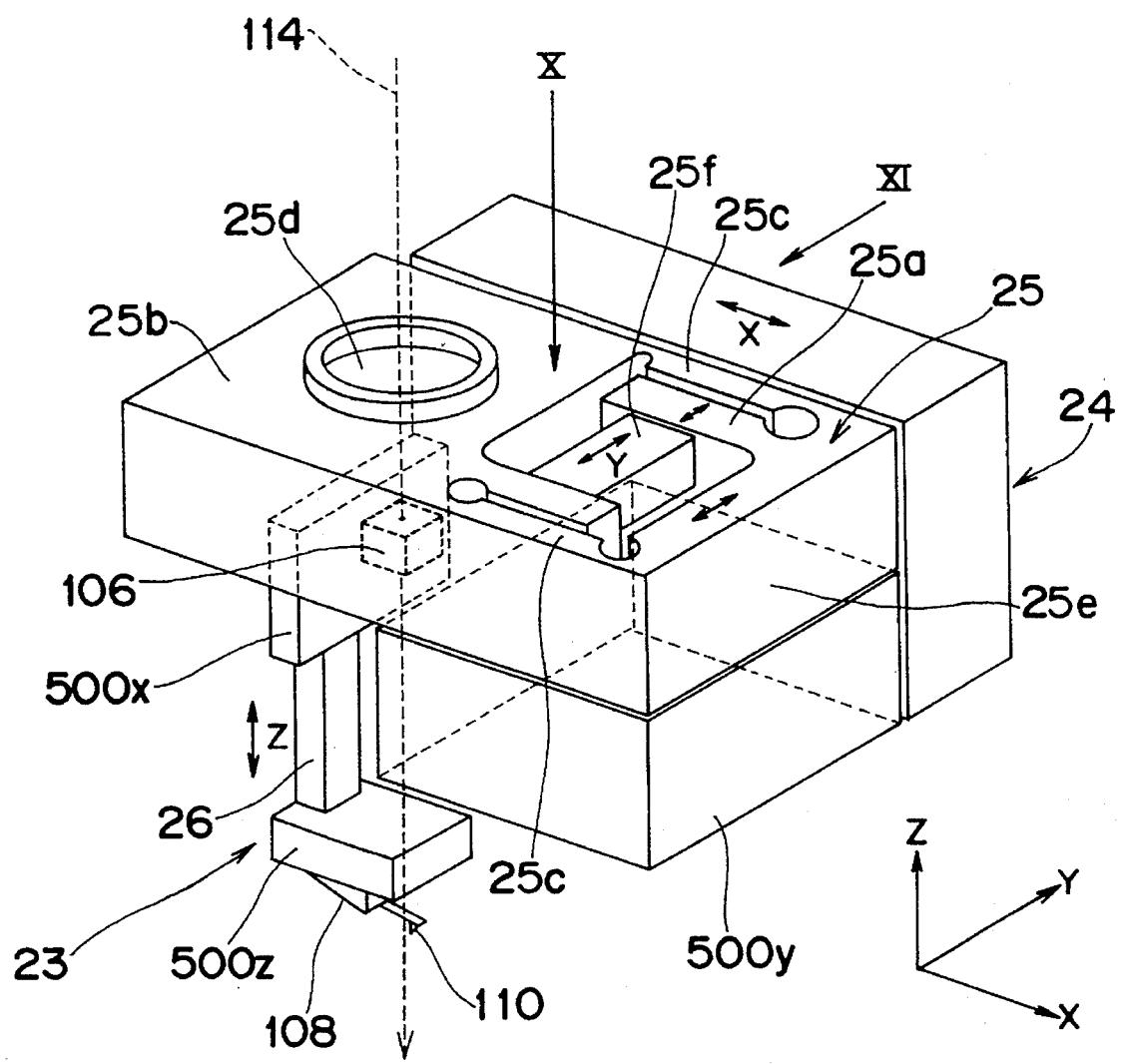
FIG. 7 is a perspective view of the measuring head in FIG. 2 according to a modification of the Embodiment 1.
Figure 8:
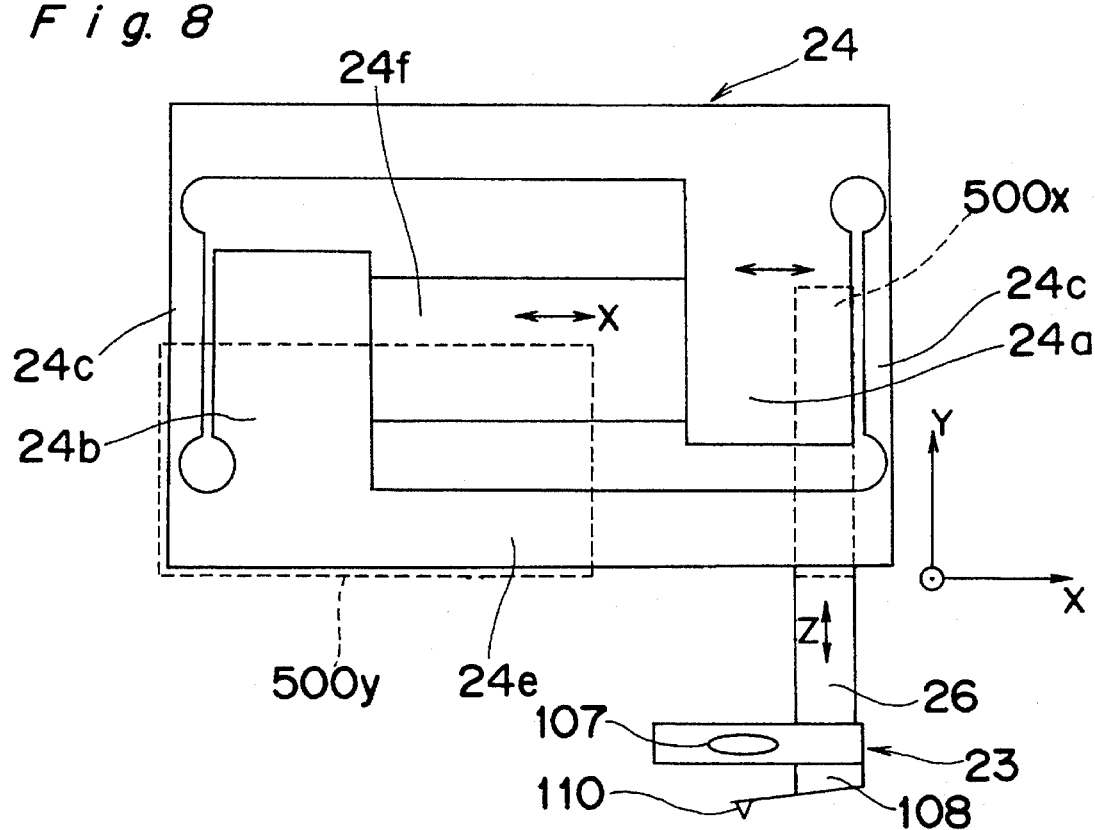
FIG. 8 is a side view of the measuring head of FIG. 7.
Figure 9:
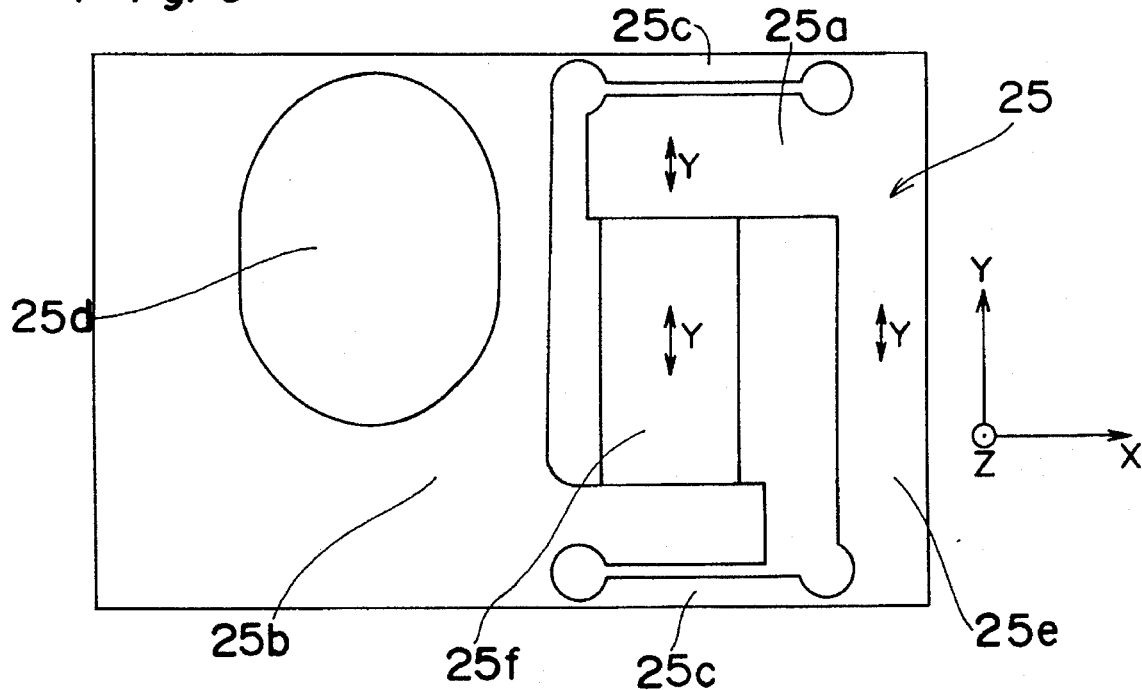
FIG. 9 is a plan view of the measuring head of FIG. 7.

As shown in FIG. 7, the Y direction scanner 25 has movable parts 25a and 25e, a static part 25b located fixedly as compared with the movable parts 25a and 25e, the piezoelectric device 25f, a parallel-plate spring 25c for connecting the movable parts 25a and 25e to the static part 25b, a connecting part 25d for fixedly connecting the Y direction scanner 25 to the rotating revolver 36. The movable parts 25a and 25e are connected with the Y optical system 500y including the semiconductor laser beam source 101, the collimator lens 102, the polarization beam splitter 104, the quarter wavelength plate 105, the mirror 111, a gate adjustment mechanism 28, and the two-piece photodiode 112. When the Y direction scanner 25 is driven by the second driver 202, the movable parts 25a and 25e together with the Y optical system 500y are moved in parallel in the Y direction while supported by the static part 25b via the parallel-plate spring 25c.

Figure 10:
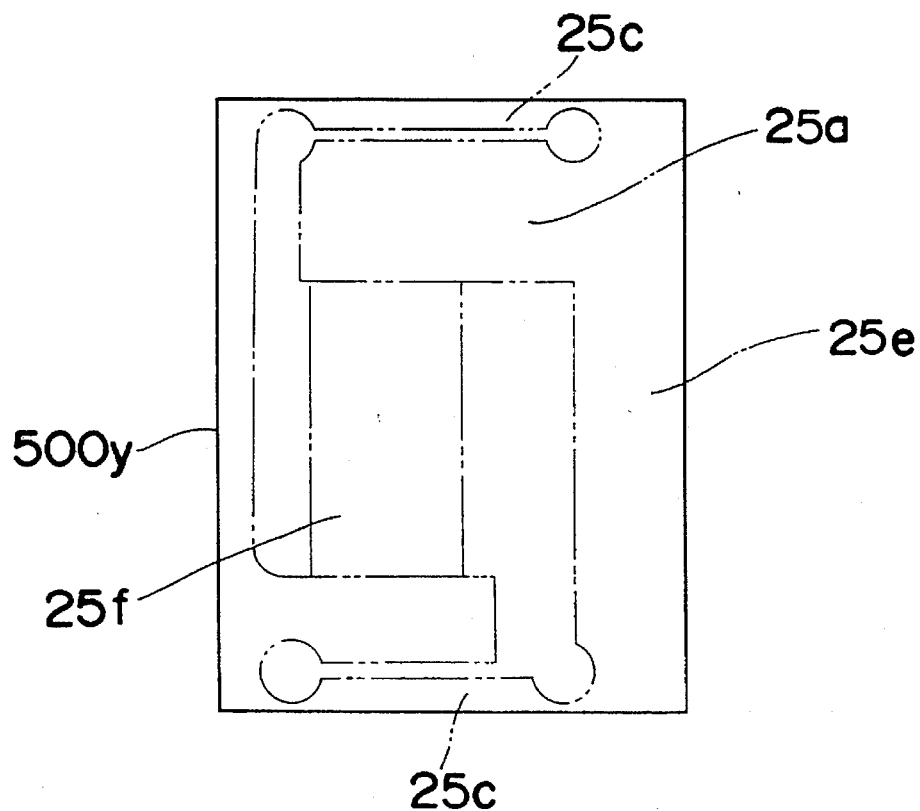
FIGS. 10 and 11 are views shown from an arrow X and an arrow XI in FIG. 7 with relative components shown by imaginary lines.
Figure 11:
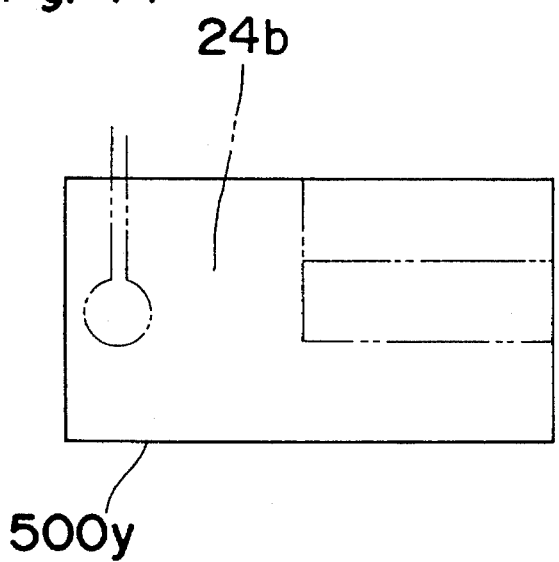

As shown in FIGS. 7–11, the X direction scanner 24 has a movable part 24a, static parts 24b and 24e located fixedly as compared with the movable part 24a, the piezoelectric device 24f, a parallel-plate spring 24c for connecting the movable part 24a to the static parts 24b and 24e. The static parts 24b and 24e are connected with the Y optical system 500y. The movable part 24a is connected with an X optical system 500x including the dichroic mirror 106. The X optical system 500x is connected with the Z direction scanner 26 made of the piezoelectric device which is connected with a Z optical system 500z including the confocal lens 107. In FIGS. 10 and 11, the Y direction scanner 25 and X direction scanner 24 which are actually arranged above the Y optical system 500y are shown by imaginary lines to make it easy to understand the connection relationship between them.

Therefore, when the X direction scanner 24 is driven by the first driver 201, the movable part 24a together with the X optical system 500x is moved in parallel in the X direction while supported by the static parts 24b and 24e via the parallel-plate spring 24c. Also, when the Z direction scanner 26 is driven by the third driver 203, the Z optical system 500z is moved in the Z direction. Then, the first, second, and third drivers 201, 202, 203 are driven by the controller 200 to drive the X direction scanner 21, Y direction scanner 22, and Z direction scanner 23 and thus move the X direction scan block 21, Y direction scan block 22, and Z direction scan block 23 in the X, Y, and Z directions, respectively. The X, Y, and Z directions are perpendicular to each other.

Figure 3:
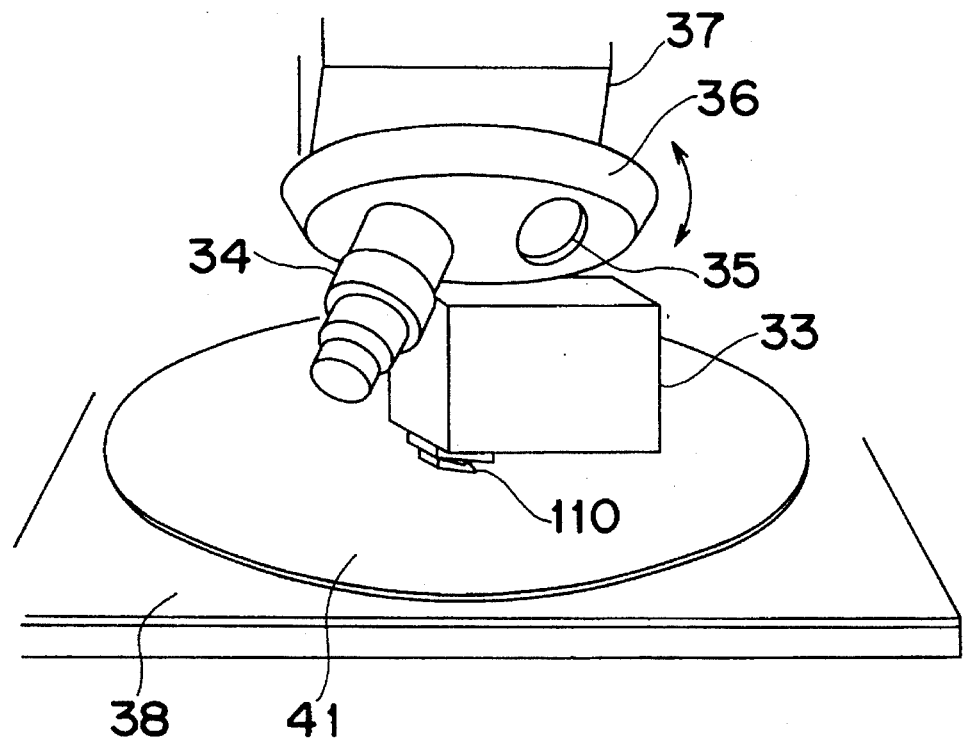
FIG. 3 is a perspective view in which the measuring head is fitted to the optical microscope head.

FIG. 3 is a view in which the measuring head 33 of the above-described atomic force microscope is fitted to a rotating revolver 36 supported by its main body 37. With such an arrangement, the measuring head 33 can be reduced in size enough to be fitted to the rotating revolver 36. The rotating revolver 36 has some number of objective lens fitting holes 35, so that objective lenses 34 having different magnifications can be fitted to these objective lens fitting holes 35 so as to allow the surface of the sample 41 to be optically observed. For a measurement by using the present equipment, the measuring head 33 is fixedly set in a position as shown in FIG. 3 by rotating the rotating revolver 36. A coarse-adjustment table 38 moves up and down with the sample 41 placed thereon. The sample 41 is made to approach the probe 110 fitted to the measuring head 33 to sufficient extent, and the surface of the sample 41 is measured. Then, based on signals from the two-piece photodiode 112, the X direction scanner 24, and the Y direction scanner 25, an image is produced.

Embodiment 2

An Embodiment 2 of the present invention is now described with reference to FIG. 4. Components in FIG. 4 designated by the same reference numerals as in FIG. 2 are the same components as those described in the Embodiment 1. Also, the principle of displacement detection is the same as that of the Embodiment 1, and therefore omitted in the following description.

Figure 4:
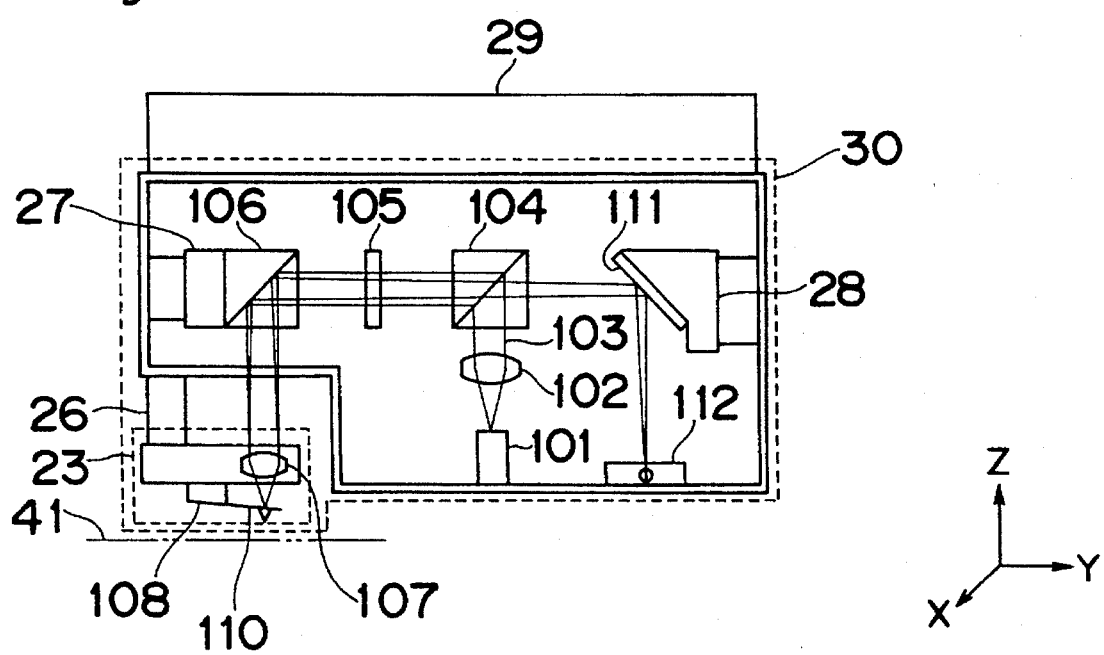
FIG. 4 is a principle view showing the construction of the measuring head of an atomic force microscope according to an Embodiment 2 of the present invention.
Figure 5:
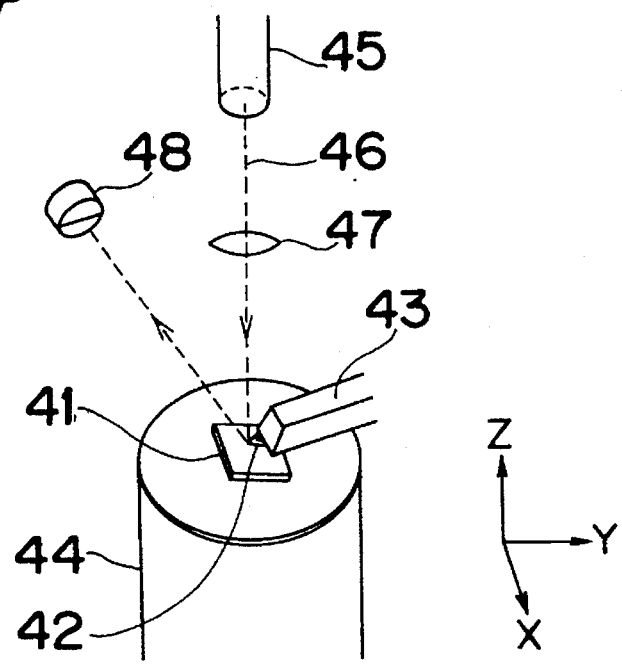
FIG. 5 is a principle view showing the construction of an atomic force microscope according to the prior art.

Referring to FIG. 4, the Z direction scanner 26 moves the Z direction scan block 23 in the Z direction, the Z direction scan block 23 composed of the confocal lens 107, the probe holder 108, and the probe 110. The Z direction scan block 23 is very lightweight and therefore able to respond in the Z direction at high speed as in the Embodiment 1. As for the X and Y directions, an X-Y direction scan block 30 further composed of a dichroic mirror 106, its gate adjustment mechanism 27, a semiconductor laser beam source 101, a collimator lens 102, a polarization beam splitter 104, a quarter wavelength plate 105, a mirror 111, its gate adjustment mechanism 28, and a two-piece photodiode 112, in addition to the Z direction scan block 23 and the Z direction scanner 26 as described above is made to scan a plane parallel to the surface of a sample 41, by an X-Y direction scanner 29. With an arrangement of the scan mechanism in which a scan mechanism to be moved in the X direction and a scan mechanism to be moved in the Y direction are provided independently of each other, as in the Embodiment 1, there may occur a non-linear distortion due to the mutual interferences of their scans during measurement processes. However, as shown in the present Embodiment 2, such interferences can be prevented by the integral scans in the X and Y directions. The X-Y direction scan block 30 to be moved by the X-Y direction scanner 29 has a required response frequency as small as several Hz to several hundredths Hz in the X-Y directions, so that even if quite a large size block (within several hundreds gram), the X-Y direction scan block 30 can be enough controlled for the scanning in the X-Y directions.

The Z direction scanner 26 can be implemented by a piezoelectric device or the like, as in the Embodiment 1. Further, although the X-Y direction scanner 29 can also be implemented by a piezoelectric device or the like similarly, a construction of the X-Y direction scanner 29 incorporating a parallel-plate spring and a piezoelectric device in combination allows a more stable scanning to be achieved, as in the Embodiment 1.

In the present Embodiment 2, like the Embodiment 1, it is preferred that the CCD camera 113 is located above the dichroic mirror 106 so that image information on the needle 100 of the probe 110 and its neighborhood can be obtained.

Embodiment 3

Figure 12:
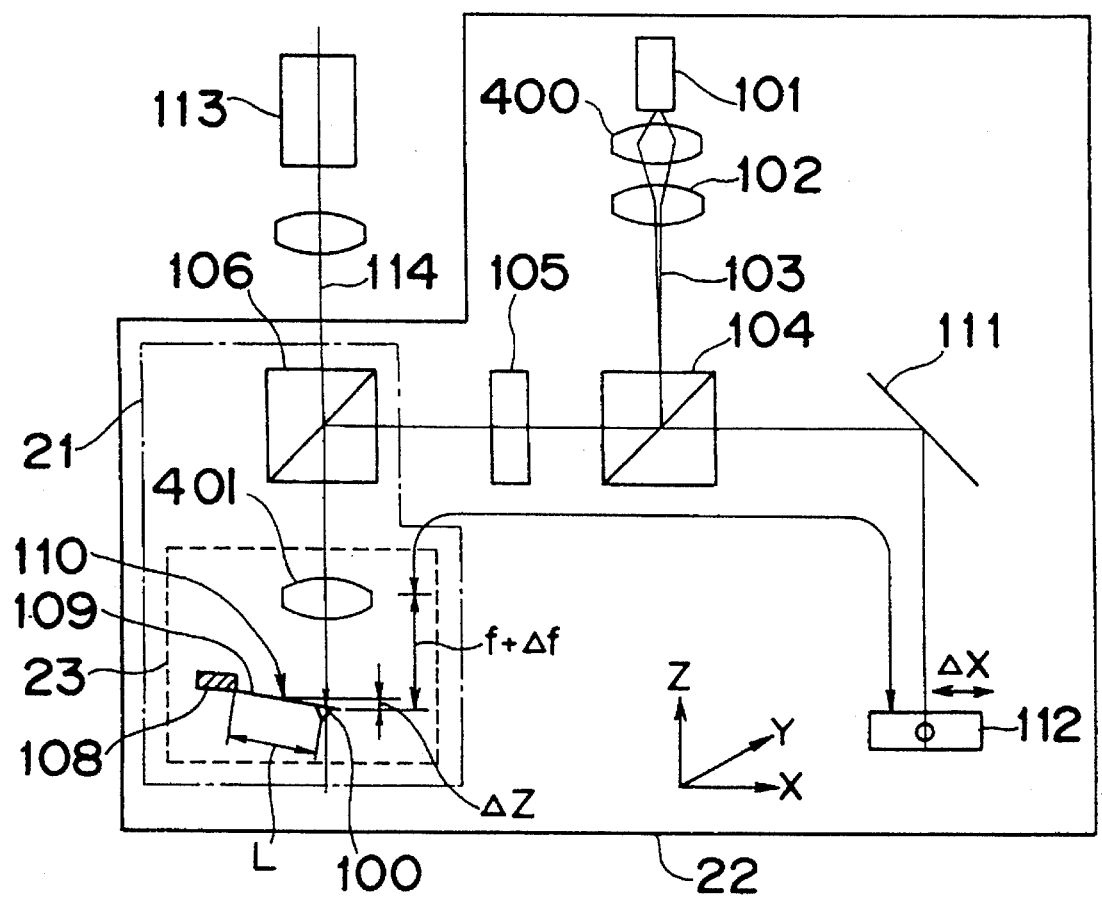
FIG. 12 is a principle view showing the construction of an atomic force microscope according to an Embodiment 3 of the present invention.

An Embodiment 3 of the present invention is now described with reference to FIG. 12. Components in FIG. 12 designated by the same reference numerals as in FIG. 1 are the same components as those described in the Embodiment 1. Also, the principle of displacement detection is the same as that of the Embodiment 1, and therefore omitted in the following description.

In the Embodiment 3, a normal lens 401 is arranged instead of the confocal lens 107 and a lens 400 is arranged between the semiconductor laser beam source 101 and the collimator lens 102 to reduce the diameter of the laser beam from the semiconductor laser beam source 101 before the collimator lens 102 collimates the laser beam 103.

In the embodiments, although the Z direction is shown as the vertical direction, the Z direction can be located in the horizontal direction in some cases.

According to the first and second aspects of the present invention, the Z direction scan block can be made very lightweight, allowing a smooth scan by the Z direction scanner for which response frequencies of several kHz are required. Meanwhile, the X direction scan block and the Y direction scan block or the X-Y direction scan block has a weight, but the response frequency required for these blocks is as small as several Hz to several hundredths Hz so that the scan by the X direction scanner and the Y direction scanner, or by the X-Y direction scanner will not be hindered. The Z direction scan block moves in the Z direction in contrast to the X direction scan block or the X-Y direction scan block, wherein the confocal lens of the Z direction scan block and the mirror of the X direction scan block or the X-Y direction scan block are always held at the same position in the X direction. Further, the displacement detection light that will be incident on the confocal lens from the mirror is collimated light. As a result, there will occur no errors in the measurement of displacements of the probe. Accordingly, it becomes possible to achieve a smooth, correct measurement through the scan by the probe with the sample fixed.

According to the third aspect of the present invention, the image underneath the probe can be captured over a wide range at a time, in addition to the advantages of the first and second aspects of the invention.

According to the atomic force microscopes of the first and second aspects of the present invention, a smooth, correct measurement can be achieved by scanning the probe side with a sample fixed. Thus, large-size, large-area samples can be measured in non-destructive state, which has conventionally been impossible.

Also, according to the third aspect of the present invention, in addition to the above advantages, the image underneath the probe can be captured over a wide range at a time, allowing an easier approach to a measurement target place.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A configuration measuring method comprising steps of:
   radiating substantially collimated displacement detection light from a detection light radiation system;
   changing the substantially collimated displacement detection light in direction by a mirror into a substantially perpendicular direction so as to be led to a first lens;
   condensing the displacement detection light by the first lens to proximities to a reflecting surface of a probe;
   reflecting the condensed light by the reflecting surface of the probe;
   displacing the reflected light by an atomic force acting against a surface of a sample, where the reflected light varies in reflection angle according to the displacement;
   leading the displaced light to the first lens;
   leading the led light to a displacement detection system by being changed in direction by the mirror into a substantially perpendicular direction; and
   detecting the light led to the displacement detection system by magnifying the displacement of the probe,
   the method further comprising steps of:
   moving a Z direction scan block in a direction vertical to the sample surface by a Z direction driving device, the Z direction scan block having the first lens and the probe;
   moving an X direction scan block in a first axial direction within a plane parallel to the sample surface by an X direction driving device, the X direction scan block having the Z direction scan block, the Z direction driving device, and the mirror; and
   moving a Y direction scan block by a Y direction driving device in a second axial direction perpendicular to the first axial direction within a plane parallel to the sample surface, the Y direction scan block having the X direction scan block, the X direction driving device, the detection light radiation system, and the displacement detection system.

2. The configuration measuring method as claimed in claim 1, wherein the first lens is a confocal lens.

3. The configuration measuring method as claimed in claim 1, wherein each of the X direction driving device, Y direction driving device, Z direction driving device is constructed by a piezoelectric device.

4. The configuration measuring method as claimed in claim 1, further comprising a step of controlling movements of the X direction driving device, Y direction driving device, and Z direction driving device based on feedback signals from the displacement detection system.

5. The configuration measuring method as claimed in claim 1, wherein the mirror reflects only the displacement detection light and transmits light of wavelengths other than that of the reflected light, the method further comprising a step of capturing a sample surface image of the probe and its neighborhood by the light transmitted by the mirror, and for displaying the image on an image display device.

6. A configuration measuring method comprising steps of:
   radiating substantially collimated displacement detection light from a detection light radiation system;
   changing the substantially collimated displacement detection light in direction by a mirror into a substantially perpendicular direction so as to be led to a first lens;
   condensing the displacement detection light by the first lens to proximities to a reflecting surface of a probe;
   reflecting the condensed light by the reflecting surface of the probe;
   displacing the reflected light by an atomic force acting against a surface of a sample, where the reflected light varies in reflection angle according to the displacement;
   leading the displaced light to the first lens;
   leading the led light to a displacement detection system by being changed in direction by the mirror into a substantially perpendicular direction; and
   detecting the light led to the displacement detection system by magnifying the displacement of the probe,
   the method further comprising steps of:
   moving a Z direction scan block in a direction vertical to the sample surface by a Z direction driving device, the Z direction scan block having the first lens and the probe;
   moving an X-Y direction scan block within a plane parallel to the sample surface by an X-Y direction driving device, the X-Y direction scan block having the Z direction scan block, the Z direction driving device, the mirror, the detection light radiation system, and the displacement detection system.

7. The configuration measuring method as claimed in claim 6, wherein the first lens is a confocal lens.

8. The configuration measuring method as claimed in claim 6, wherein each of the X-Y direction driving device and Z direction driving device is constructed by a piezoelectric device.

9. The configuration measuring method as claimed in claim 6, further comprising a step of controlling movements of the X-Y direction driving device and Z direction driving device based on feedback signals from the displacement detection system.

10. The configuration measuring method as claimed in claim 6, wherein the mirror reflects only the displacement detection light and transmits light of wavelengths other than that of the reflected light, the method further comprising a step of capturing a sample surface image of the probe and its neighborhood by the light transmitted by the mirror, and for displaying the image on an image display device.

11. A configuration measuring apparatus in which substantially collimated displacement detection light radiated from a detection light radiation system is changed in direction by a mirror into a substantially perpendicular direction so as to be led to a first lens; displacement detection light is condensed by the first lens to proximities to a reflecting surface of a probe; and in which reflected light reflected by the reflecting surface of the probe that will be displaced by an atomic force acting against a surface of a sample, where the reflected light varies in reflection angle according to the displacement, is led to the first lens and then, by being changed in direction by the mirror into a substantially perpendicular direction, led to a displacement detection system, where the displacement of the probe is magnified and detected,
   the apparatus comprising:
   a Z direction scan block having the first lens and the probe;
   a Z direction driving device for moving the Z direction scan block in a direction vertical to the sample surface;
   an X direction scan block connected to the Z direction scan block, the Z direction driving device, and the mirror;
   an X direction driving device for moving the X direction scan block in a first axial direction within a plane parallel to the sample surface;
   a Y direction scan block connected to the X direction scan block, the X direction driving device, the detection light radiation system, and the displacement detection system; and
   a Y direction driving device for moving the Y direction scan block in a second axial direction perpendicular to the first axial direction within the plane parallel to the sample surface.

12. The configuration measuring apparatus as claimed in claim 11, wherein the first lens is a confocal lens.

13. The configuration measuring apparatus as claimed in claim 11, wherein each of the X direction driving device, Y direction driving device, Z direction driving device is constructed by a piezoelectric device.

14. The configuration measuring method as claimed in claim 11, further comprising a controller for controlling movements of the X direction driving device, Y direction driving device, and Z direction driving device based on feedback signals from the displacement detection system.

15. The configuration measuring method as claimed in claim 11, wherein the mirror reflects only the displacement detection light and transmits light of wavelengths other than that of the reflected light, the apparatus further comprising an image device for capturing a sample surface image of the probe and its neighborhood by the light transmitted by the mirror, and for displaying the image on the image display device.

16. A configuration measuring apparatus in which substantially collimated displacement detection light radiated from a detection light radiation system is changed in direction by a mirror into a substantially perpendicular direction so as to be led to a first lens; displacement detection light is condensed by the first lens to proximities to a reflecting surface of a probe; and in which reflected light reflected by the reflecting surface of the probe that will be displaced by an atomic force acting against a surface of a sample, where the reflected light varies in reflection angle according to the displacement, is led to the first lens and then, by being changed in direction by the mirror into a substantially perpendicular direction, led to a displacement detection system, where the displacement of the probe is magnified and detected, the apparatus comprising:
- a Z direction scan block having the first lens and the probe;
- a Z direction driving device for moving the Z direction scan block in a direction vertical to the sample surface;
- an X-Y direction scan block connected to the Z direction scan block, the Z direction driving device, the mirror, the detection light radiation system, and the displacement detection system; and
- an X-Y direction driving device for moving the X direction scan block within a plane parallel to the sample surface.

17. The configuration measuring apparatus as claimed in claim 16, wherein the first lens is a confocal lens.

18. The configuration measuring apparatus as claimed in claim 16, wherein each of the X-Y direction driving device and Z direction driving device is constructed by a piezo-electric device.

19. The configuration measuring method as claimed in claim 16, further comprising a controller for controlling movements of the X-Y direction driving device and Z direction driving device based on feedback signals from the displacement detection system.

20. The configuration measuring method as claimed in claim 16, wherein the mirror reflects only the displacement detection light and transmits light of wavelengths other than that of the reflected light, the apparatus further comprising an image device for capturing a sample surface image of the probe and its neighborhood by the light transmitted by the mirror, and for displaying the image on the image display device.

* * * * *